United States Patent
Rudy

(12) United States Patent (10) Patent No.: US 6,227,336 B1
(45) Date of Patent: May 8, 2001

(54) LINEAR GUIDE

(75) Inventor: Dietmar Rudy, Kaiserslautern (DE)

(73) Assignee: INA Walzlager Schaeffler oHG, Herzogenaurach (DE)

(*) Notice: Subject to any disclaimer, the term of this patent is extended or adjusted under 35 U.S.C. 154(b) by 0 days.

(21) Appl. No.: 09/402,910

(22) PCT Filed: Mar. 18, 1998

(86) PCT No.: PCT/EP98/01560

§ 371 Date: Nov. 11, 1999

§ 102(e) Date: Nov. 11, 1999

(87) PCT Pub. No.: WO98/46393

PCT Pub. Date: Oct. 22, 1998

(30) Foreign Application Priority Data

Apr. 11, 1997 (DE) .............................................. 197 15 014

(51) Int. Cl.$^7$ ....................................................... B61H 7/12
(52) U.S. Cl. ............................. 188/43; 188/41; 104/259; 92/88
(58) Field of Search .................................. 188/41, 43, 44, 188/58, 62; 104/252, 259; 92/27, 28, 88

(56) References Cited

U.S. PATENT DOCUMENTS

| 4,185,539 | * | 1/1980 | Stratienko ................................. 91/45 |
| 4,926,982 | * | 5/1990 | Granbom ............................... 188/271 |
| 4,953,988 |   | 9/1990 | Tsukada . |
| 5,111,913 | * | 5/1992 | Granbom ............................... 188/67 |
| 5,205,204 | * | 4/1993 | Gottling et al. .......................... 92/28 |
| 5,273,367 | * | 12/1993 | Tanaka ................................... 384/45 |
| 5,293,812 | * | 3/1994 | Maki et al. ................................. 92/27 |
| 5,302,062 |   | 4/1994 | Baba et al. . |
| 5,653,314 | * | 8/1997 | Yamamoto et al. .................... 188/67 |
| 5,678,663 | * | 10/1997 | Watanabe et al. ...................... 188/67 |

FOREIGN PATENT DOCUMENTS

| 1 448 549 | 3/1970 | (DE) . |
| 1 625 490 | 7/1970 | (DE) . |
| 1 765 353 | 6/1972 | (DE) . |
| 97 843 | 5/1973 | (DE) . |
| 37 07 046 A1 | 9/1988 | (DE) . |
| 37 25 731 A1 | 2/1989 | (DE) . |
| 40 12 524 A1 | 10/1991 | (DE) . |
| 43 34 424 A1 | 4/1994 | (DE) . |
| 295 05 080 | 7/1995 | (DE) . |
| 195 33 077 A1 | 3/1996 | (DE) . |
| 195 44 534 A1 | 6/1997 | (DE) . |
| 2 246 088 | 1/1992 | (GB) . |

* cited by examiner

*Primary Examiner*—Robert J. Oberleitner
*Assistant Examiner*—Melody M. Burch
(74) *Attorney, Agent, or Firm*—Volpe & Koenig, P.C.

(57) ABSTRACT

A linear guide having a carrier body that can be moved along a guide track is provided having a brake device with brake shoes acting upon the guide track and a piston which is located in a pressure chamber which can be displaced by a pressure medium in the carrier body. The brake device has a spring acting upon the piston. Pressure plates are provided in the carrier body which are pressed against the brake shoes located on the guide track by the spring when the piston is not being subjected to the pressure medium. This results in a linear guide whose carrier body can be mechanically and reliably locked on the guide track in case of emergencies such as pressure medium outages.

6 Claims, 2 Drawing Sheets

LINEAR GUIDE

BACKGROUND OF THE INVENTION

The invention concerns a linear guide with a supporting body movable along a guide rail and a braking device, which has brake shoes acting on the guide rail and a piston, which is arranged movable in a pressure chamber by a pressure medium, whereby the braking device also has a spring acting on the piston.

Linear guides are used, among other things, in connection with machine tools with high speed drives, linear tables and laser processing machines, for example with linear drives. Such a linear guide is known from DE-GM 295 05 080 in which the braking or clamping force is applied by a pressure medium, for example, a hydraulic pressure medium such as oil. From safety technical perspectives, this linear guide is nonetheless unsuitable, because when an undesired pressure build up occurs in the pressure medium, a braking or clamping fast of the supporting body on the guide rail can no longer take place.

SUMMARY OF THE INVENTION

Underlying the invention is the object of creating a linear guide having a supporting body which, in emergency situations, such as a pressure medium failure, can be mechanically clamped and braked in a secure manner on the guide rail.

This objective is accomplished in accordance with the invention in that in the supporting body adjacent to the piston in the longitudinal direction of the guide rail a pressure plate is arranged which, in the state where the piston is not acted upon by the pressure medium, is pressed by the spring on one of the brake shoes which lie on the guide rail. Several pressure plates can also be used. For example, in the supporting body in the longitudinal direction of the guide rail on both sides next to the piston, a pressure plate acted upon by the spring can be arranged in any case. A conduit for the pressure medium can discharge in the area of the pressure chamber, in which the front face of the piston facing the brake shoe is situated.

In this way, one obtains a linear guide with a mechanical emergency brake. Especially for perpendicular table axes in connection with which the mechanical mass balance fails, or for rapidly moving horizontal table axes which are directly driven without a mechanical self-locking component, such as a jack screw, the braking function necessary from the perspective of safety is guaranteed in the event of a drop in pressure. When pressure energy is supplied, the brake opens, when pressure drops, it closes.

BRIEF DESCRIPTION OF THE DRAWING

Embodiments of the invention are represented in the drawing and will be described in greater detail below, wherein.

DETAILED DESCRIPTION OF THE INVENTION

Figure 1:
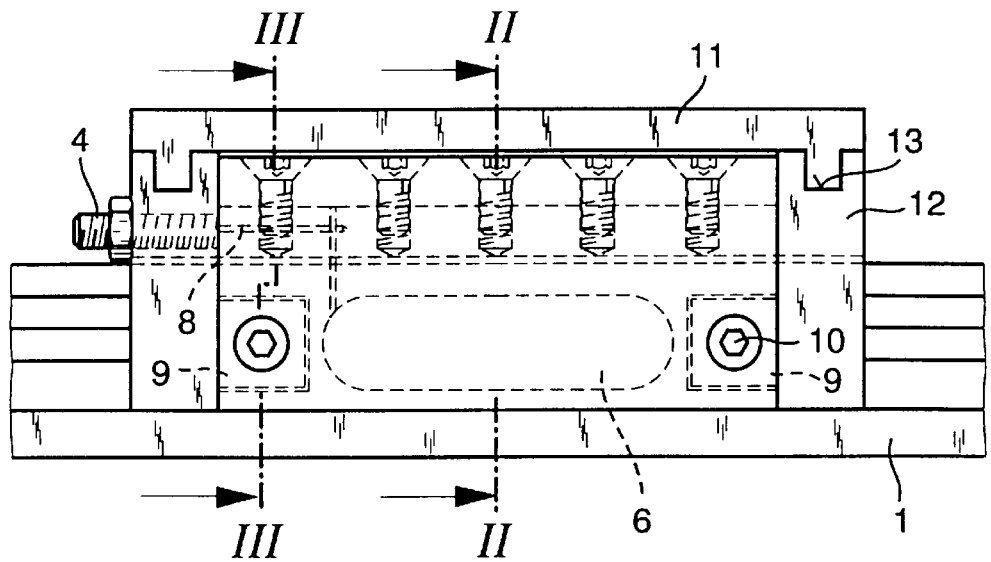
FIG. 1 is a side view of a supporting body of a linear guide which is movable along a guide rail.
Figure 2:
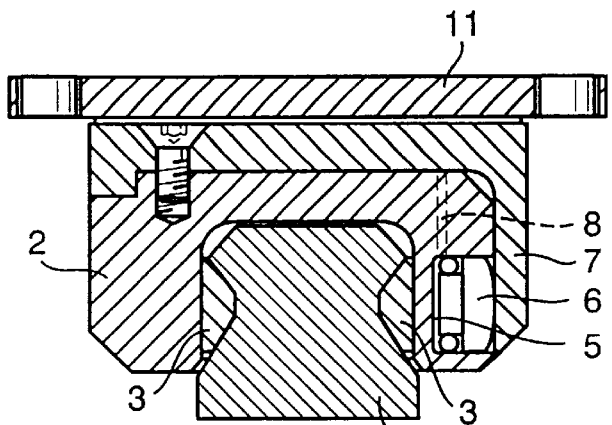
FIG. 2 is a cross section of the linear guide taken along line II—II of FIG. 1.
Figure 3:
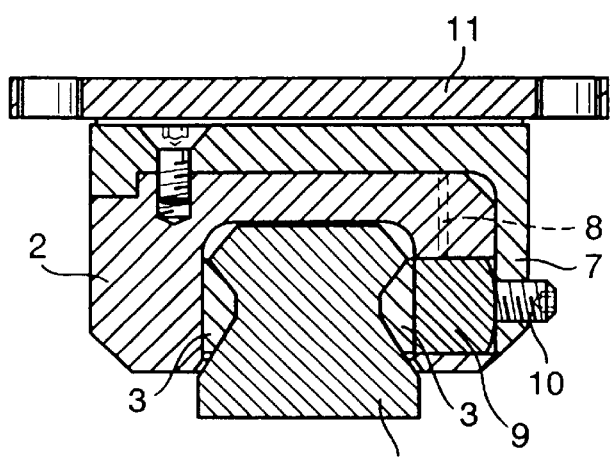
FIG. 3 is a cross section of the linear guide taken along line III—III of FIG. 1.

In the embodiment of the invention shown in FIGS. 1 to 3, a supporting body 2 is supported on a guide rail 1 and movable along the guide rail 1. Brake shoes 3 lie on both longitudinal sides of the guide rail 1. These are part of a braking device with which the supporting body 2 can be clamped on the guide rail 1. Through a pressure connection 4, a pressure chamber 5 constructed in the supporting body 2 is acted upon with a hydraulic pressure medium. A piston 6 arranged in the pressure chamber 5 transmits, on the basis of fluid pressure, a compressive force to a spring 7 which is constructed as a bending spring and fastened on the supporting body 2. A conduit 8 which is connected with the pressure connection 4 opens in the area of the pressure chamber 5 in which the piston 6 has a front face directed away from the spring 7 and toward the adjacent brake shoe 3. Thus, if pressure medium flows through the conduit 8 into the pressure chamber 5, the spring is pressed outward by the piston 6.

The brake shoes 3, which are situated on both sides between the guide rail 1 and the supporting body 2, can be made of special brake or friction-bearing material. Between the spring 7 and the brake shoe 3 facing the piston 5, two pressure plates 9 are moreover situated in any given case in front of and in back of the piston 6 in the longitudinal direction of the guide rail 1. If the force of the piston 6 (as a consequence of the fluid pressure of the pressure medium in the pressure chamber 5) exceeds the prestressing force of the spring 7, then the pressure plates 9 are unencumbered and can no longer exert any force on the associated brake shoe. The supporting body 2 is then not clamped on the guide rail 1 and consequently is easily movable along it in the direction of guidance.

If as a consequence of an emergency situation, the pressure in the pressure chamber 5 drops, then the force exerted by the piston 6 on the spring 7 also disappears. This can take place deliberately slowly, or in sudden bursts as well. The spring 7, which can be elastically prestressed by screws 10, is now no longer braced on the piston 6, but rather it bends back into the prestressed initial position until it lies completely on the pressure plates 9. The spring 7 therewith exerts a spring force over the pressure plates 9 on the adjacent brake shoe 3, which once again braces itself on the guide rail 1. Since the spring 7 is fastened on the supporting body 2, the force of reaction of the spring 7 now draws the supporting body 2 as well over the further brake shoe 3, which lies on the other long side of the guide rail 1, likewise onto the guide rail. This presupposes that a driver 11 of the supporting body 2 is mounted freely movable for a connection construction crosswise to the guide rail 1. In the guide direction, the driver 11 is rigidly connected with the supporting body 2. For this purpose, a plate 12 mounted in each case on the front end on the supporting body 2 has a groove 13 into which a guide projection of the driver 11 projects. The groove 13 and the projection run crosswise to the longitudinal direction of the guide rail 1.

On the basis of the prestressing of the springs 7 constructed as bending springs, the two brake shoes 3 exert on each longitudinal side of the guide rail a force directed toward the middle of the guide rail 1 so that the supporting body 2 is clamped fast on the guide rail. The level of this braking force is guided by the magnitude of the prestressing of the spring 7 and the force of friction which arises between the brake shoes 3 and the guide rail 1. The prestressing of the spring 7 can be adjusted with the screws 10 which are braced on the pressure plates 9.

Constructions are also conceivable in connection with which one spring 7 and one or more pistons 6 as well as pressure plates 9 are arranged on each longitudinal side of the guide rail 1 and the corresponding side of the supporting body 2. With such a construction, the driver 11 does not need to be movable crosswise in relation to the direction of guidance. A driver is also conceivable which is rigidly connected with the supporting body 2.

Figure 4:
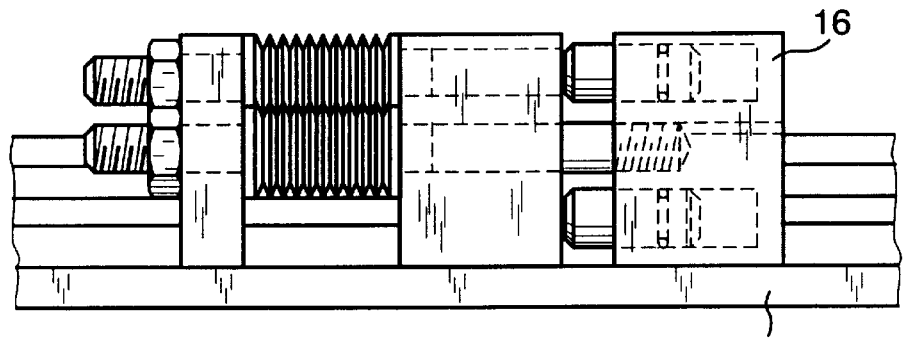
FIG. 4 is a side view of a second embodiment of a supporting body of a linear guide which is movable along a guide rail.
Figure 5:
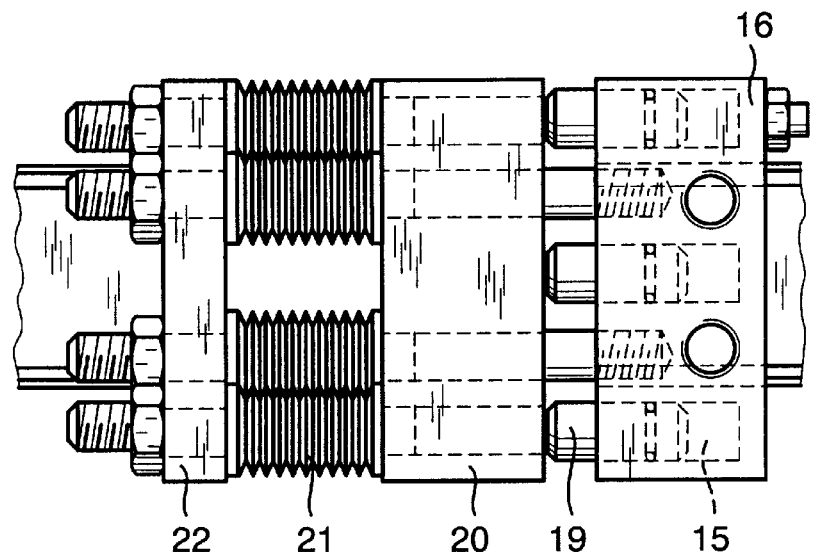
FIG. 5 is a top view of the second embodiment.
Figure 6:
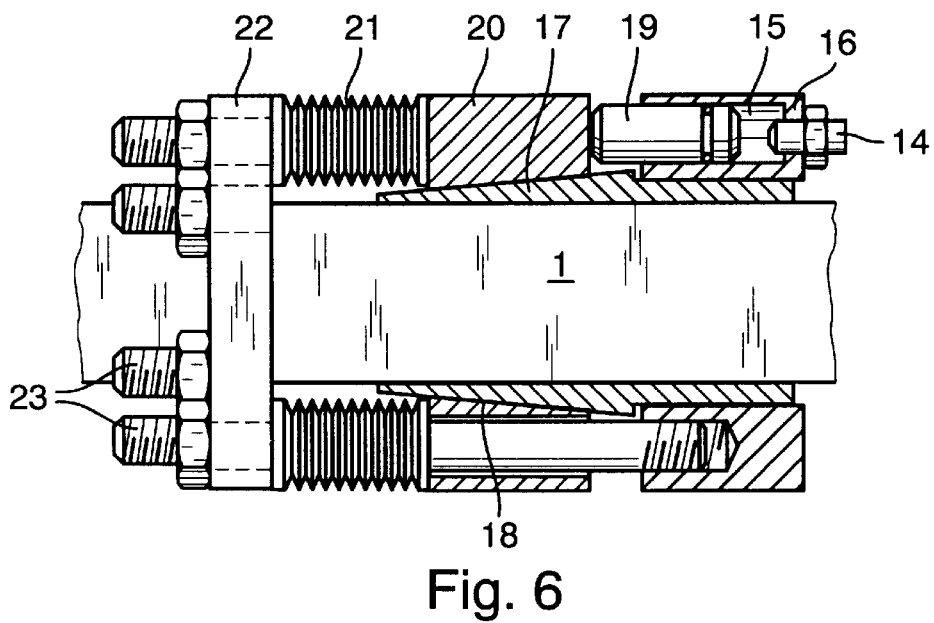
FIG. 6 is a side cutaway view of the second embodiment showing wedge-shaped brake shoes.

With the embodiment of the invention according to FIGS. 4 to 6, through a pressure connection 14, one or more pressure chambers 15 connected with one another which are situated in a U-shaped supporting body 16 can be acted upon with a pressure medium. Two brake shoes 17 are connected with the supporting body 16 whose outer surfaces in any given case support an inclined plane 18 so that the brake shoes 17 are wedge shaped. The connection with the supporting body 16 can be realized in any given case by pinning, screwing or gluing. The pressure chambers 15 are closed off with the pistons 19 which are braced on a likewise U-shaped slide 20 in the direction of pressure which is slid over the brake shoe 17 projecting into the direction of guidance out of the supporting body 16. The interior surfaces of the slide 20, which in any given case cover the areas of the brake shoes 17, are constructed corresponding to the wedge shape of the brake shoes 17. The slide 20 is pressed against springs 21 by the piston forces acting upon it in the direction of guidance which can be made of any desired spring elements, for example cup or disk springs. Each spring 21 is braced in the direction of guidance on a common plate 22 over which tension rods 23 are connected with the supporting body 16. Instead of tension rods 23, frames or lateral plates are also conceivable. In the illustrated case, the tension rods 23 go through the slide 20 which has appropriate passage bore holes. Through the compressive force, the slide 20 is pressed against the prestressed springs 21 which has as a consequence that it moves down in the direction of guidance from the inclined planes 18 of the brake shoes 17 until these are completely relieved.

When an emergency situation is triggered, the pressure of the pressure medium and therewith the force of each piston 19 which acts on the slide can drop. This has as a consequence that the slide 20 is now pressed by the springs 21 on the wedge surfaces of the brake shoes 17, and this presses, in an intensified manner due to the wedge angle, against the guide rail 1. In this way, the supporting body 16 is braked and clamped fast on the guide rail 1.

For heightening the braking action, the surface of the inclined planes 18 can be provided with a friction-bearing coating to diminish friction. Likewise, the arrangement of roller elements between this surface and the slide 20 is possible, as for example, a needle cage, ball bearings or cylindrical roller bearings.

REFERENCE NUMBERS

1. Guide rail
2. Supporting body
3. Brake shoe
4. Pressure connection
5. Pressure chamber
6. Piston
7. Spring
8. Conduit
9. Pressure plate
10. Screw
11. Driver
12. Plate
13. Groove
14. Pressure connection
15. Pressure chamber
16. Supporting body
17. Brake shoe
18. Inclined plane
19. Piston
20. Slide
21. Spring
22. Plate
23. Tension rod

What is claimed is:

1. A linear guide with a supporting body (2) movable along a guide rail (1) and a braking device which has brake shoes (3) acting on the guide rail (1) and a piston (6) which is arranged movably in a pressure chamber (5) of the supporting body (2) by a pressure medium, whereby the braking device also has a spring (7) acting on the piston (6), characterized in that in the supporting body (2) next to the piston (6) in the longitudinal direction of the guide rail (1), pressure plates (9) are arranged which, in the state where the piston (6) is not acted upon by the pressure medium, are pressed by the spring (7) on one of the brake shoes (3) which lie on the guide rail (1).

2. The linear guide according to claim 1, characterized in that in the supporting body (2), pressure plates (9) are arranged in the longitudinal direction of the guide rail such that one of the pressure plates is in front of and the other of the pressure plates is in back of the piston (6), said pressure plates are acted upon by the spring.

3. The linear guide according to claim 1, characterized in that in the area of the pressure chamber (5) in which the front face of the piston (6) facing the brake shoe (3) is situated, a conduit (8) for the pressure medium opens.

4. The linear guide according to claim 1, characterized in that the spring (7) acting upon the piston (6) is constructed as a bending spring.

5. A linear guide with a supporting body movable along a guide rail, and a braking device which has brake shoes acting on the guide rail and at least one piston, which is arranged movable in a pressure chamber of the supporting body by a pressure medium, whereby the braking device also has a spring acting on the piston, characterized in that between the piston (19) and the spring (21), a slide (20) is arranged by which the brake shoes (17) connected with the supporting body (16) in the no pressure state of the pressure chamber (15) are pressed against the guide rail (1), wherein the brake shoes (17) are constructed wedge-shaped for intensifying the braking action, and in each case have a surface formed as inclined planes (18) on which the slide (20) with a corresponding inclined surface lies.

6. The linear guide according to claim 5, characterized in that the braking device has several springs (21) which are braced on a common plate (22) which is connected with the supporting body (16) through tension rods (23).

* * * * *